Nov. 23, 1937.  A. V. DE FOREST  2,099,725

SCRATCH RECORDER

Filed Dec. 4, 1934

INVENTOR
A. V. de Forest
BY
ATTORNEY

UNITED STATES PATENT OFFICE 2,099,725

SCRATCH RECORDER

Alfred V. de Forest, Southport, Conn., assignor to Baldwin-Southwark Corporation, a corporation of Delaware Application December 4, 1934, Serial No. 755,913

6 Claims. (Cl. 234—70)

This invention relates generally to an improved apparatus for determining and recording strains to which either a specimen or a life size member may be subjected and relates more particularly to an improved simplified scratch recorder.

It is one object of my invention to provide an improved scratch recorder that is extremely simple, compact and inexpensive whereby it may be readily applied to large or small members or to moving members, one example being revolving airplane propellers. A further object is to provide an improved simplified recorder that is sufficiently inexpensive, without sacrifice of its precision qualities, that it may be used for a relatively small number of tests and then discarded if desired. A further object is to provide such a scratch type recorder adapted to be made from relatively thin sheet metal, and in this respect the recorder comprises a target and marker, the target member being constructed so that an integral part thereof, specifically a clip bar, cooperates directly with a combined marker and biasing spring. As a result of the simplicity of these two elements and their extremely light weight and low cost, it is possible to apply the same directly to life size members such as propeller blades having a relatively high rotative speed or other moving members as well as to stationary members or specimens.

I employ the principle that friction of rest is greater than moving friction and then use a biasing force on the marker less than the friction of rest but greater than the moving friction thereby permitting relative transverse feeding movement between the marker and target upon occurrence of relative longitudinal movement between the same caused by deformation of a specimen under stresses of various kinds. Enlargement of the scratch record by a microscope permits accurate determination of the magnitude of the deformations and also the variations in sequence with which the strain occurs. Various other characteristics which are desirable in determining characteristics of material may also be obtained.

Other objects and advantages will be more apparent to those skilled in the art from the following description of the accompanying drawing in which.

Figure 1:
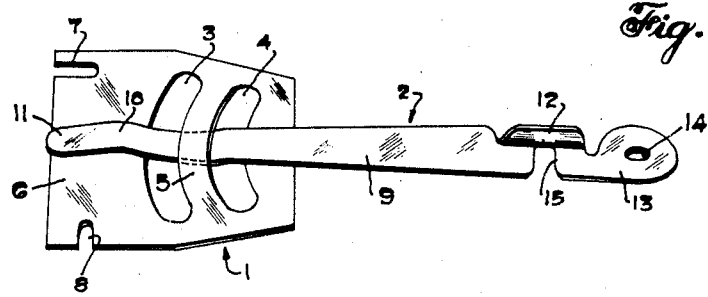
Fig. 1 is an enlarged view of the instrument.

In the illustrated embodiment of the invention which is shown herein merely for the purpose of disclosing one specific form among possible others that the invention might take in practice, I have provided a record receiving member 1 and a marker member 2. The member 1 is hereinafter referred to as a target and the invention is referred to as a scratch recorder, for the reason that these terms have come into usage with the new field of applicant's invention. Both of these elements are preferably made of thin sheet metal adapted to be stamped with dies. The target 1 has two elongated arcuate openings 3 and 4 and an intermediate clip bar 5 while a polished record surface 6 is provided preferably on the outer end of the target 1. The target is normally held in position on a specimen or other member to be tested, by screws passing through longitudinal and lateral slots 7 and 8.

The marker 2 consists of an arm 9 extending beneath clip bar 5 and then preferably curving upwardly as at 10 and downwardly at its outer marking end 11. The inner end of arm 9 is connected by a combined spring and fulcrum 12 with a holding end 13 which is normally fixed to the specimen or other member to be tested, as by a screw passing through opening 14. It will be noted that the combined spring and fulcrum 12 is merely an upturned portion of the sheet metal forming the element 12 and in order to permit portion 12 to function as a fulcrum, a notch 15 is cut in the flat portion of the metal.

The marking end 11 is provided with grains 11a of any suitable abrasive material that will scratch the record surface 6, that is, scribe a record thereon, such surface being highly polished and suitably protected if desired by a gummed paper strip until ready for use when such paper is removed. Preferably the abrasive is in the form of grains of carborundum which may be from one to several in number spaced on the under surface of end 11. These grains whether of carborundum, diamond chips or other suitable material may be embedded in a suitable matrix of cured rubber on the end 11.

In operation the elements 1 and 2 are secured to a member to be tested in their relative position as shown in Fig. 1, screws being inserted through opening 14 and slots 7 and 8. The scratch arm 9 is then manually moved in a clockwise direction to one end of slots 3 and 4. The arm 9, in thus moving, fulcrums around portion 12 and at the same time this portion is subjected to a spring tension due to the holding end 13 being secured to the member. The scratch arm 9 is held at the clockwise end of slots 3 and 4 due to frictional contact between arm 9 and clip bar 5 and between the scratch points and the record surface 6. This is static friction or friction of rest which creates a sufficient force to prevent spring 12 from moving arm 9 in a counterclockwise direction. However, when the specimen or member is elongating under a tension stress, or is contracting under a compression stress, then relative longitudinal movement occurs between the marker and target. During such movement the friction above-mentioned is reduced from static friction to moving friction (dynamic friction) and this moving or dynamic friction is not sufficient to resist the lateral force of spring 12. As a result, said spring laterally moves arm 9 in a counterclockwise direction about portion 12 as a fulcrum. The extent of counterclockwise movement is of course very small as the moving friction at least retards rapid movement, and when there is no further relative longitudinal movement between the marker and target, the moving friction is instantaneously transformed into static friction which immediately prevents further lateral movement of the marker by spring 12. At this moment a reversal of stress from tension to compression or from compression to tension, or a variation in the stress, usually occurs in the specimen or member under test, and hence the fibers of the specimen undergo further relative longitudinal movement in a direction opposite to that which originally occurred. Hence this relative movement again transforms the static friction into dynamic friction with the result that spring 12 can again laterally move the marker arm 9 in a counterclockwise direction. Again this lateral movement is of small magnitude. As a result of such variations in stress, the marker arm 9 is gradually successively moved in a counterclockwise direction until the record is complete. Thereupon the target 1 is removed from the member, and the marks 16 thereon are enlarged as indicated in the illustrative records of Figs. 3 and 4. The records under various conditions and tests may vary widely as is also illustrated in Figs. 3 and 4.

Figure 2:
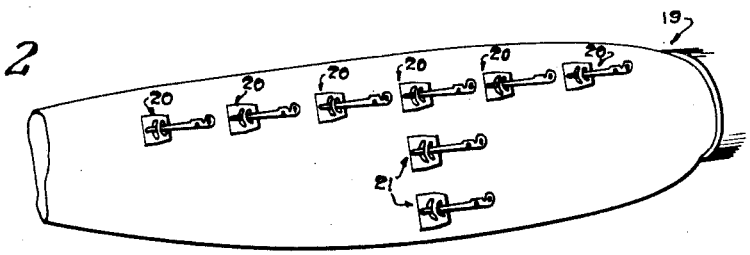
Fig. 2 is a fragmentary perspective of a propeller blade showing the application of my improved instrument.

Scratch records such as above described may be obtained in a great number of applications especially on moving members such as an airplane propeller blade diagrammaticaly indicated at 19 in Fig. 2. Here a series of instruments 20 is placed in longitudinal alignment from hub to tip of the blade while a few instruments 21 may be placed in parallel relation but transversely of the blade.

Figure 3:
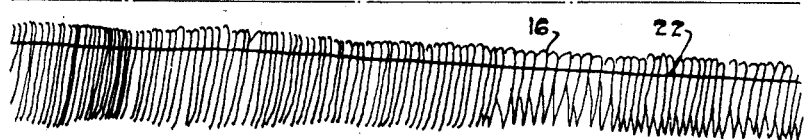
Figs. 3 and 4 are enlargements of the scratch records obtained.
Figure 4:
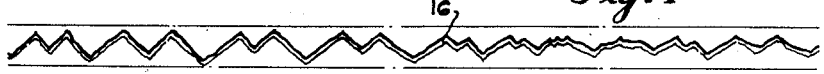
Figure 5:
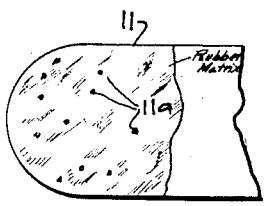
Fig. 5 is an enlarged end of the marker with its abrasive points.

While only one scratch record is shown in each of Figs. 3 and 4, yet it will be understood that preferably a number of individual grit particles are embedded in the matrix of rubber on the under side of the marker end 11. The number and position of these scratching points are somewhat haphazard but in the great majority of cases three types of scratches are recorded. Some are too deep and ragged for good measurement, some are suitable for use and some are too thin to be readily seen, much less photographed. Occasionally a record will be obtained where all the scratches are too deep or where the good ones are obscured by the bad ones. For this reason it is sometimes desirable, and also to serve as a check, to use two recorders on each location of measurement wherever possible. It further occasionally happens that a grain which cuts a good record of repeated strains does not cut a good zero line such as 22 when the arm is manually moved out from the center of clip 5 at the beginning of a run. In this case, the relation between zero and the strain can often be obtained from a different scratch provided that there are two or more scratches available. Hence if one scratch is not sufficiently clear so as to be suitable for a zero line, then the probabilities are that a second scratch will be clear. Thus it is seen that one grit particle may function to make a zero line and another grit particle may function to record the strain. The best records are thus where a number of marking points are distributed widely. The thin tip 11 of the scratch arm carrying the abrasive must therefore lie as flat as possible on the target and this may be accomplished by a little adjustment depending on conditions of mounting. The transverse movement of the scratch arm is regulated by the stiffness of the spring and the friction as previously mentioned. The friction can be widely varied by bending the bar 9 to a higher or lower level as compared with the level of the target. If several thousand stress variations are to be recorded and the motion is a simple one in which harmonics are of no interest, the friction can be high and the transverse travel small as is represented in the closely packed record shown in Fig. 3. If on the other extreme hand, the problem is one of harmonic analysis, the scale must be opened up to show the scale of small deformations such as shown in Fig. 4 which illustrates the interference portion of a record from an engine driven propeller vibrating simultaneously in several modes. In general, high rates of vibration particularly in the presence of impact require high friction and high spring pressure. Less drastic conditions can be met with lower friction and longer records obtained by weakening the spring portion 12 as by reducing its thickness with a small file. This reduction should preferably be local to concentrate the bend as nearly at a point as is practical.

Various conditions of operation will dictate to one skilled in the use of my improved recorder the manner in which the instrument may be most efficiently and effectively used. Also by proper analysis of the character of scratch, it is possible to determine if shear or torsion is present as well as other types of stresses. It is thus seen that I have provided an extremely simple and yet most highly effective precision instrument capable of accomplishing results especially in connection with live moving members that have been heretofore substantially impossible of accomplishment.

It will of course be understood that various changes in details of construction and arrangement of parts may be made by those skilled in the art without departing from the spirit of the invention as set forth in the appended claims.

I claim:

1. A scratch recorder comprising a target having a clip bar and a recording surface, a marker arm extending beneath said clip bar and on top of said recording surface, means whereby said marker arm and target may be attached to a specimen subjected to strain variations thereby to effect relative longitudinal movement between said arm and target, and means for biasing said marker arm so that it traverses said surface upon occurrence of said relative movement between said marker arm and target.

2. A scratch recorder comprising a sheet metal target and marker arm, means whereby said sheet metal elements have provision for maintaining a predetermined degree of static and dynamic frictional contact between the same, means whereby said marker arm and target may be attached to a specimen subjected to strain variations thereby to effect relative longitudinal movement between said arm and target, and biasing means for effecting relative feeding movement between the arm and target.

3. A scratch recorder comprising a sheet metal target having a recording surface and two transverse slots with a clip bar therebetween, a marker arm extending through said slots and beneath said clip bar and resting on said recording surface, and means whereby said marker arm and target may be attached to a specimen subjected to strain variations thereby to effect relative longitudinal movement between said arm and target, said marker arm having a portion formed as a spring operative to bias the arm substantially transversely to the direction of strain.

4. As an article of manufacture, a marker arm for a scratch recorder comprising an elongated sheet metal member having one end adapted for fixation to a member and the other end provided with a scratch point, said arm having a right angle portion located only intermediately of the ends of said arm and whose thickness constitutes the entire width of the arm at that point whereby said portion may function as a fulcrum and spring.

5. As an article of manufacture, a target for a scratch recorder comprising a sheet metal member having a recording surface and two transverse slots with a clip bar formed therebetween.

6. A scratch recorder comprising a record receiving member, a marker having a spring portion formed as a part thereof to effect relative feeding movement between the marker and record receiving member, means for attaching said record receiving member and marker to a specimen so as to effect relative longitudinal movement between the marker and record receiving member during stress variations in the specimen, said recorder elements being arranged to have static friction when no longitudinal movement occurs and to have dynamic friction upon occurrence of said longitudinal movement, the dynamic friction allowing said spring portion to effect said feeding movement and the static friction preventing such feeding movement automatically in accordance with stress variations in the specimen.

ALFRED V. DE FOREST.